United States Patent [19]

Sharp

[11] Patent Number: 5,058,633

[45] Date of Patent: Oct. 22, 1991

[54] CONTAINMENT ASSEMBLY FOR FILL PIPE OF UNDERGROUND STORAGE TANKS

[76] Inventor: Bruce R. Sharp, 7685 Fields-Ertel Rd., Cincinnati, Ohio 45241

[21] Appl. No.: 403,135

[22] Filed: Sep. 5, 1989

[51] Int. Cl.[5] ........................... B65B 3/06; B65G 5/00

[52] U.S. Cl. ........................................ 141/86; 141/98; 404/25; 405/55; 52/20; 137/312; 137/371; 220/85 F; 220/86.1

[58] Field of Search ........................ 141/85, 86, 88, 98, 141/311 A, 286, 115; 220/18, 85 S, 85 F, 85 UR, 85 VS, 86 R; 137/234.6, 236.1, 312-314, 363-372; 52/19-21; 405/52, 55; 404/25, 26

[56] References Cited

U.S. PATENT DOCUMENTS

| | | | |
|---|---|---|---|
| 1,788,998 | 1/1931 | Glass | 404/25 |
| 2,129,924 | 9/1938 | Galbraith | 220/85 F |
| 2,204,329 | 6/1940 | Tennant | 220/85 S |
| 2,382,555 | 8/1945 | Elliot | 220/85 S |
| 4,278,115 | 7/1981 | Briles et al. | 141/86 |
| 4,457,349 | 7/1984 | Vazin | 141/86 |
| 4,520,852 | 6/1985 | Klein | 141/86 |
| 4,593,714 | 6/1986 | Madden | 137/371 |
| 4,639,164 | 1/1987 | Pugnale et al. | 220/18 |
| 4,655,361 | 4/1987 | Clover et al. | 220/85 |
| 4,663,614 | 5/1987 | Rauchwerger | 340/605 |
| 4,685,585 | 8/1987 | Robbins | 220/256 |
| 4,706,718 | 11/1987 | Milo | 141/86 |
| 4,762,440 | 8/1988 | Argandonna | 405/52 |
| 4,770,317 | 9/1988 | Podgers et al. | 220/86 R |
| 4,793,387 | 12/1988 | LeBlanc et al. | 141/86 |
| 4,796,676 | 1/1989 | Hendershot et al. | 141/98 |
| 4,856,564 | 8/1989 | Obal | 141/86 |

*Primary Examiner*—Henry J. Recla
*Assistant Examiner*—Casey Jacyna
*Attorney, Agent, or Firm*—Charles R. Wilson

[57] ABSTRACT

An assembly intended for use on underground storage tanks provides ready access to a fill pipe from ground level. At the same time the assembly serves as a spill containment means for accidental spillage and a secondary containment means for the fill pipe. The assembly of the invention comprises a secondary containment chamber having a sidewall with means for attaching to the storage tank. An anchor ring which is attached to an upper open end of the containment chamber acts as a permanent ground base for the assembly. A bridging surface cover within the anchor ring has a removable lid positioned in its interior portion to gain access to the chamber's interior for a filling operation. The assembly also comprises a fill pipe for delivering liquid to the storage tank. The fill pipe is positioned within the secondary containment chamber with a discharging end extending through the chamber's bottom and a receiving end terminating within the chamber but near the bridging surface cover. An open top spill compartment is positioned within the secondary containment chamber and at the receiving end of the fill pipe so as to encompass the fill pipe's receiving end for the purpose of catching any spilled liquid from the filling operation. The spill compartment also prevents any of the spilled liquid and vapors from entering the secondary containment chamber.

9 Claims, 6 Drawing Sheets

CONTAINMENT ASSEMBLY FOR FILL PIPE OF UNDERGROUND STORAGE TANKS

FIELD OF INVENTION

This invention relates to a containment assembly for use with underground storage tanks. More particularly, the invention relates to an assembly for containing liquids from accidental spills and leaking fill pipes of underground storage tanks.

BACKGROUND OF THE INVENTION

Underground storage tanks for holding a variety of liquids are well known. The most common use of storage tanks are those which are buried underground in gasoline service stations. Such tanks 10 normally contain at least ten thousand gallons of liquid. A typical service station will have anywhere from two to eight such tanks. A fill port at ground level is used for filling the tanks. An individual tank can have its own fill port and fill pipe, though most multiple tank systems will have one fill port which is inter- connected with all of the underground storage tanks. The tanks are continually being emptied and of course have to be refilled. A conventional transport truck is used for the refilling operation. Thus, access will be gained to the fill port and gasoline contained in the transport tank is unloaded by gravity feed into the underground storage tanks.

Leaks from defective underground storage tanks have occurred and have been well documented. Numerous attempts have been made in recent years to rectify the situation. Another lesser problem with underground storage tanks is in the careless filling of the tanks from the transport truck. The fill operation is such that it is possible for gasoline from the transport truck to be accidentally spilled onto the ground. These spills can be minor or can be rather substantial. Even minor spills over a length of time will build up and pose a significant environmental problem. Very little attention has been given to the problem associated with the fill operation. However, this too is an area of concern which must be addressed.

There is a need for better containment of the fill pipe of underground storage tanks. The known systems designed to contain spillage are adequate to a certain extent. However, there is still a need for a containment system which confines any spillage as well as encloses the fill pipe. There is also a need to continually monitor the system. Accidental spills are known when they occur. However, a slow leak through the fill pipe itself will most likely go undetected until substantial damage has occurred. In accord with this demonstrated need, there has been devised a containment assembly for use on underground storage tanks. The assembly is readily adapted for use on existing storage tanks. It solves many of the problems heretofore experienced.

SUMMARY OF THE INVENTION

An assembly for use on underground storage tanks provides ready access to a fill pipe from ground level. At the same time the assembly serves as a spill containment means for accidental spillage and a secondary containment means for the fill pipe. The assembly comprises a secondary containment chamber having a sidewall with means for attaching to the storage tank. An anchor ring is attached to an upper open end of the containment chamber to provide a permanent ground base for the assembly. A bridging surface cover within the anchor ring has a removable lid positioned in its interior portion which is readily removed to gain access to the chamber's interior for a filling operation. The assembly also comprises a fill pipe for delivering liquid to the storage tank. The fill pipe is positioned within the secondary containment chamber with a discharging end extending through the chamber's bottom and a receiving end terminating within the chamber but near the bridging surface cover. An open top spill compartment is positioned within the secondary containment chamber and at the receiving end of the fill pipe so as to encompass the fill pipe's receiving end for the purpose of catching any spilled liquid from the filling operation. The spill compartment is attached to the bridging surface cover by an adjustable collar to prevent any of the spilled liquid and vapors from entering the secondary containment chamber.

DETAILED DESCRIPTION OF THE INVENTION

The description which follows describes the invention in terms of its use with underground gasoline storage tanks of the nature found in retail gasoline service stations. It should be understood the invention has applicability for other uses as well. For example, underground storage tanks used for storing of industrial liquids in bulk can utilize the present invention. However, the invention lends itself particularly well to underground tanks used for storing gasoline and, therefore this preferred use is described in the following paragraphs.

Figure 1:
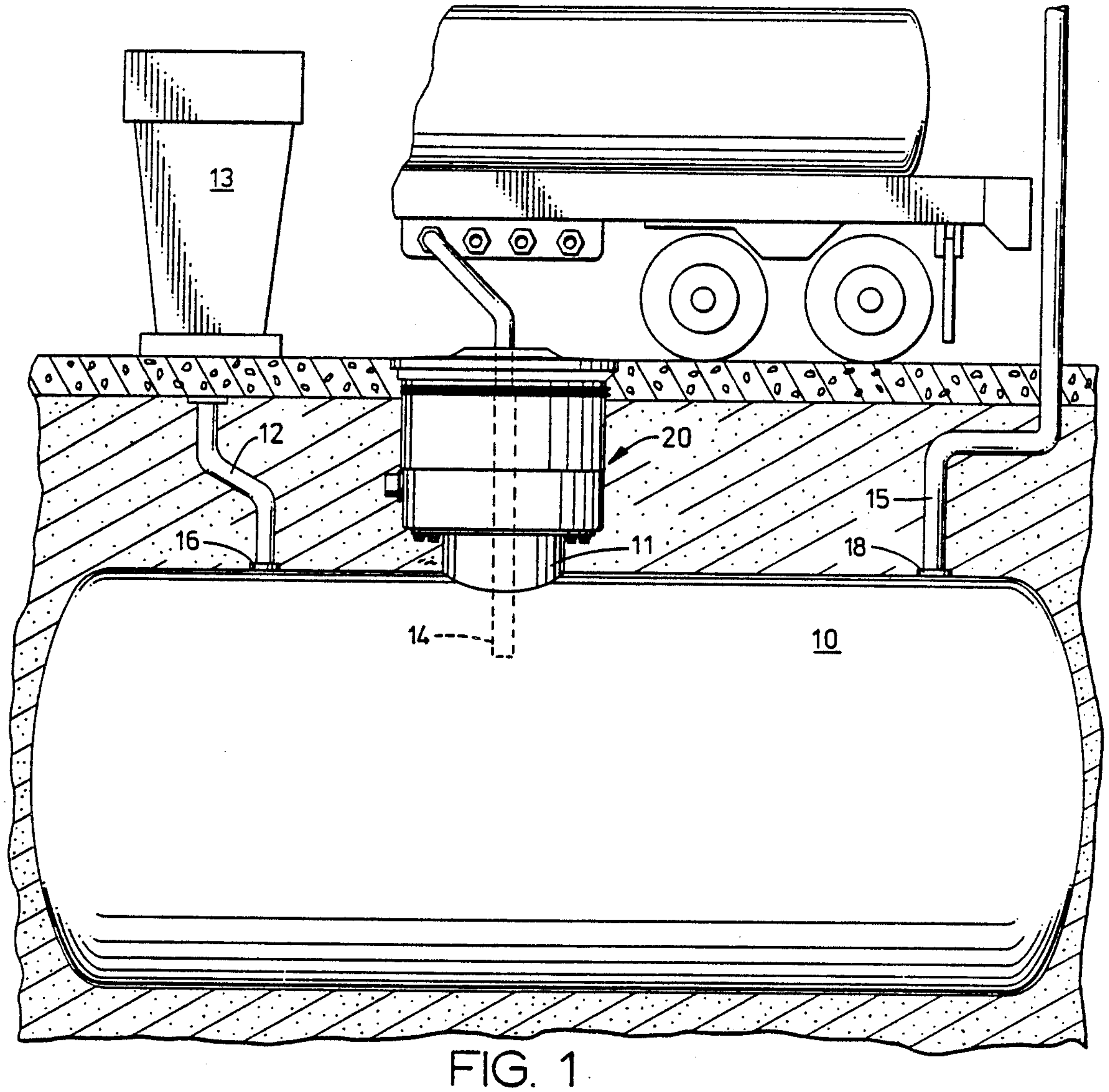
FIG. 1 is a side view of an underground storage tank in the process of being filled from a transport truck with the containment assembly of this invention positioned on said storage tank.

With reference to FIG. 1, the assembly of the present invention is adapted for attachment to a rigid storage tank 10. The storage tank 10 is made of metal such as steel. Storage tanks made of a fibrous reinforced resinous material e.g. a fiberglass reinforced polyester or vinylester material are also known and can be used in this invention. As shown, though not required, a manway 11 is securely attached to the storage tank. The manway's primary function is to serve as a means by which access can be gained to the interior of the tank. The manway is generally cylindrical in shape and about one to three feet in diameter, though other shapes and dimensions can be utilized. Such tanks with or without the manway are well known and are commonly used for storage of various liquids.

Passing into the storage tank 10 are various access lines typically associated with underground storage tanks. Thus, a dispensing line 12 leads to a ground level gasoline dispenser 13, a fill pipe extension 14 extends into the tank with an opening near the tank's bottom, and a vent pipe 15 leads to the atmosphere. They are all secured to the tank's surface by double threaded bushings 16, 17 (see FIG. 2), and 18, respectively.

The assembly 20 of this invention is useful on the known underground storage tanks. The description which follows is to an assembly which is adapted for attachment to an underground storage tank having a manway. The assembly, with changes of a routine nature primarily involving attachment means, is adapted for use directly on the top surface of a storage tank of the variety not having a manway.

Figure 2:
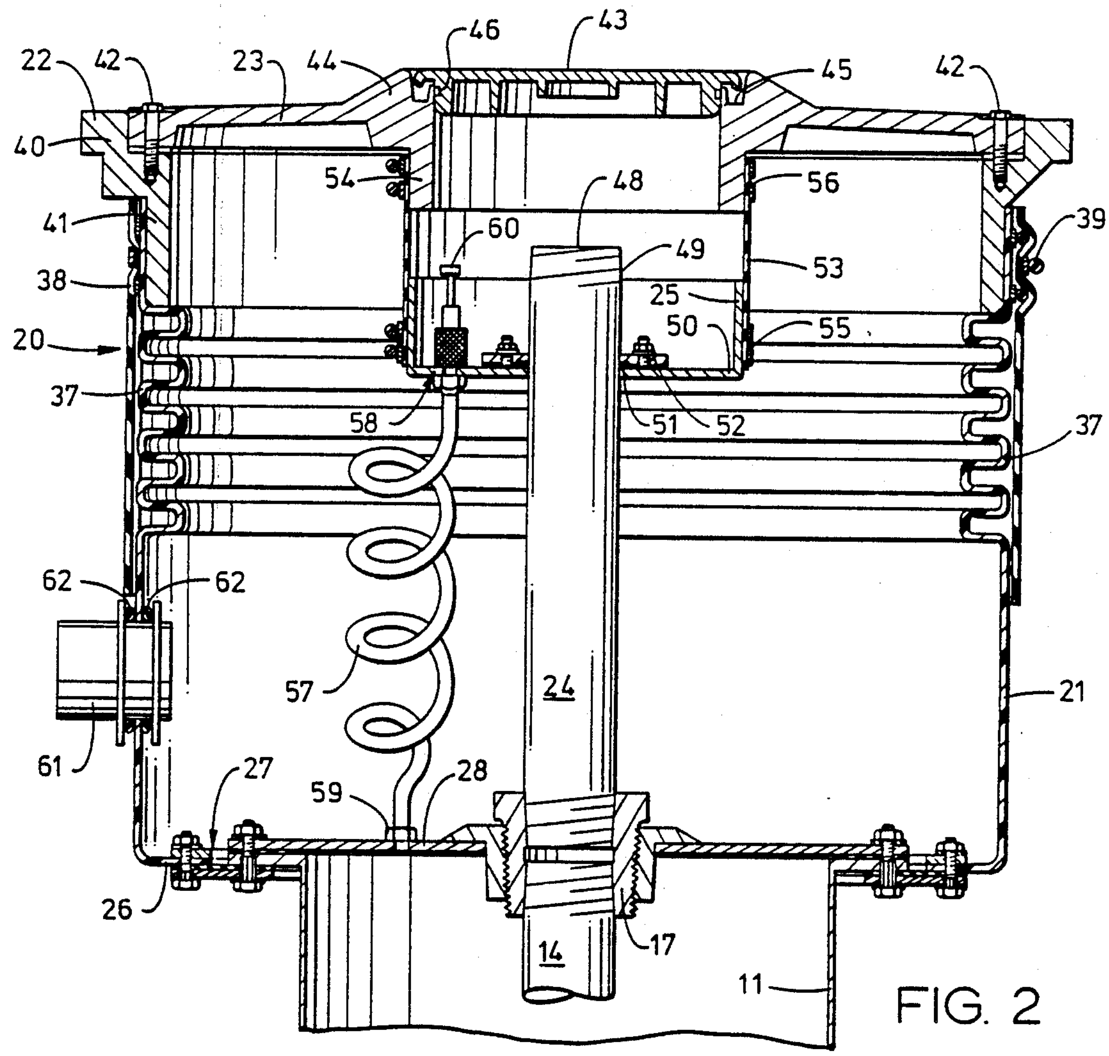
FIG. 2 is a front view partially in section of the containment assembly of FIG. 1.

As best shown in FIG. 2, the assembly 20 comprises as its essential components a secondary containment chamber 21, an anchor ring 22, a bridging surface cover 23, a fill pipe 24 and an open top spill compartment 25. The secondary containment chamber 21 is cylindrical-shaped and has as its purpose the containment of any leakage through the fill pipe. Other shaped chambers can as well be used, though the cylindrical shape is preferred because of ease of fabrication. As shown, the chamber is attached to the manway 11 in a manner which provides a leak-proof bottom wall to the chamber. In effect, a lower flange 26 extending inwardly from a sidewall of the chamber, attachment system 27 and cover 28 for the manway provide a bottom wall for the chamber. The secondary containment chamber 21 could as well have a bottom wall which is structurally integral with the chamber's sidewall, though is not preferred because of cost and installation reasons.

Figure 3:
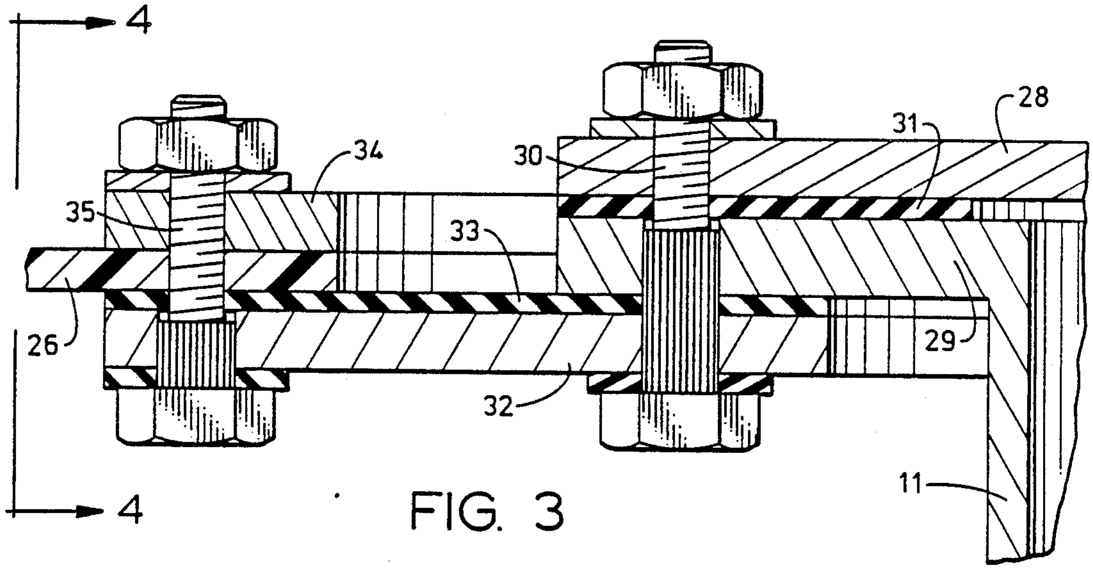
FIG. 3 is a front view partially in section of the containment assembly of FIG. 2 showing attachment means to the underground storage tank in detail.
Figure 4:
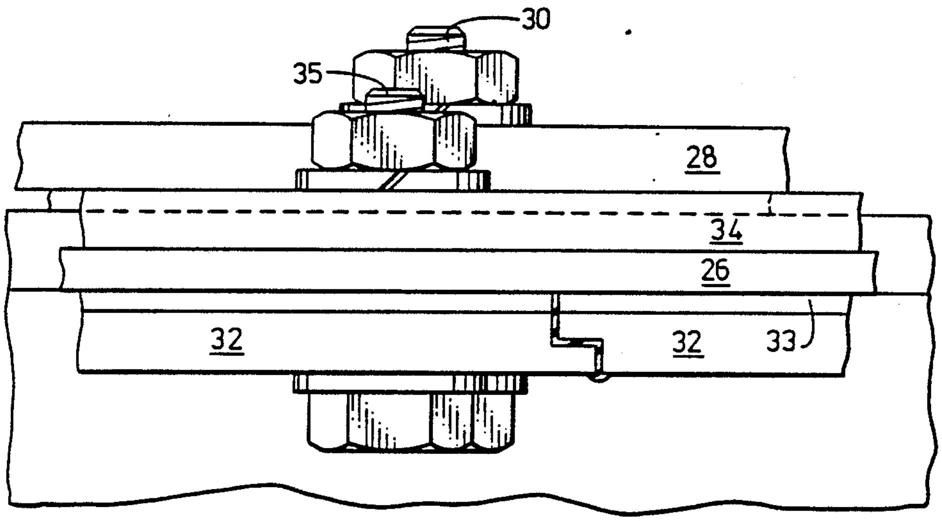
FIG. 4 is a side view of the attachment means taken along line 4—4 of FIG. 3.

A liquid tight seal between the flange 26 of the secondary containment chamber 21 and cover 28 of the storage tank's manway is required. Several means for accomplishing such a seal can be used. The attachment system 27 best depicted in FIGS. 3 and 4 is preferred. With reference to FIG. 3 the manway 11 itself has a flange 29 extending outwardly from its top opening. The flange has a series of bolt holes in it to accommodate bolts 30. A matching ring gasket 31 is also provided on the top surface of the flange 29 between it and cover 28. Tightening of the nuts on bolts 30 compresses gasket 31 in a conventional fashion to seal off the interior of the manway. In the attachment system for the assembly 20 there is used a split metal seal ring 32 and gasket 33 on the underside of flange 29. Holes along the inside periphery of the ring and gasket are made to align with the bolt holes in the manway flange 29. A second set of holes along the outside periphery of the split metal ring 32 and gasket 33 are made to align with holes in the lower flange 26 of the containment chamber. A second metal ring 34 is provided to fit over lower flange bolts 35 and rest on the lower flange's top surface. Its purpose is to absorb forces created when nuts are tightened on bolts 35 to hold the lower flange in a liquid tight fashion to the split metal ring 32.

The attachment system 27 described most importantly provides a liquid tight seal which, of course, is needed should there ever be a liquid leak into the secondary containment chamber which needs to be contained. Additionally, the attachment system allows ready assembly during installation and disassembly when periodic inspection of the storage tank requires passing of an individual through the manway and into the storage tank. Further, the attachment system allows disassembly of the secondary containment chamber without disturbing the manway seal.

In a preferred embodiment of the invention also shown in FIG. 2 a portion of the secondary containment sidewall is corrugated to allow expansion. Thus, corrugated sidewall portion 37 is capable of limited extension and contraction to allow a degree of tolerance in the distance between the underground storage tank's top surface and a level ground surface cover for the chamber. More importantly, the expansion means allows the assembly to withstand a certain degree of ground movement such as comes from freeze/thaw situations without a cracking problem. Also, preferably, a dirt shield 38 comprised of a cylindrical-shaped skirt is dimensioned to fit around the chamber's sidewalls and cover the corrugated sidewall portion 37. A band clamp 39 can be used to attach the dirt shield to the sidewall. The purpose of the shield is to keep the corrugated sidewall portion 37 free of soil which can pack into the inner parts of the corrugations and reduce its expansion capability.

The anchor ring 22 acting as a permanent ground base for the assembly is attached to the upper open end of the cylindrical-shaped sidewalls of the containment chamber 21. The anchor ring is intended to be permanently set at ground level into the ground surface area by cement, asphalt, etc. The anchor ring has a shoulder 40 on which rests the bridging surface cover 23 and an extending neck 41 from the shoulder dimensioned to fit into the containment chamber in a sealing manner. The bridging surface cover 23 closes off the containment chamber 21, preferably in a water tight manner. Bolts 42 are provided to hold the cover to the anchor ring.

A fill pipe lid 43 is provided in the bridging surface cover 23 to allow access to the interior of the chamber 21, specifically the spill compartment 25 contained therein and the fill pipe 24 positioned therein. The lid 43 is readily removed by the transport truck operator during any fill operation.

Preferably, the bridging surface cover has a raised slotted circular shoulder 44 with a recessed area 45 to receive the fill pipe lid. The shoulder acts as an aid in keeping rain and dirt out of the fill pipe area. Most rain water will naturally drain off the fill pipe lid. A certain amount of water will collect in the recessed area 45 in the bridging surface cover for receiving the fill pipe lid. An O-ring 46 on the lid's neck is optionally provided to aid in keeping rain water and soil out of the spill compartment 25.

Fill pipe 24 leading to the manway cover 28 is attached by use of the double threaded bushing 17. Fill pipe extension 14 is connected thereto and as aforementioned extends into the storage tank 11 with its opening near the storage tank's bottom wall to minimize splashing and vapor formation during a fill operation. The opening 48 of the fill pipe 24 at its receiving end 49 is near ground surface level for ease of filling, though, of course, within the spill compartment and accordingly, the secondary containment chamber. Normally, though not necessary, a cap (not shown) is clamped to the receiving end of the fill pipe to further assure against unwanted debris entering the storage tank. Several caps and fill adaptors for this purpose are known and can be used.

The assembly of the invention also comprises an open top spill compartment 25. The compartment is preferably cylindrical-shaped as shown and is positioned to encompass the receiving end 49 of the fill pipe 24. A bottom wall 50 with a hole to allow the fill pipe to pass through is a part of the compartment. Gasket 51 and attachment means 52 are used to hold the spill compartment to the fill pipe in a permanent liquid-tight fashion. The spill compartment provides two very important functions. First, it serves to catch any spilled liquid during a fill operation and second, it prevents any vapors from entering into the secondary chamber. Each function is mandated by recent federal regulations.

Associated with the spill compartment 25 is a side collar 53. Side collar 53 is held to spill compartment 25 and inner neck 54 of bridging surface cover 23 in a sealed fashion by band clamps 55 and 56 respectively. This has the effect of extending the spill compartment to ground level. The collar also allows a degree of flexibility in vertical and lateral alignment of the various structural components of the assembly during its initial installation.

With reference to FIG. 2, a drainage hose 57 is preferably provided to drain spilled liquid from the spill compartment 25 to the underground storage tank 11. The hose is ideally flexible and extendable for ease of installation purposes. The hose extends from the bottom wall 50 of the spill compartment 25, through the interior of the secondary containment chamber 21, and through the manway cover 28. Fittings 58 and 59 are used in the spill compartment and manway cover to hold the drainage hose in position. A valve 60 can be provided in the hose to control the flow of spilled liquid and is most preferred so that a means is available to close off the storage tank's interior after the fill operation is completed.

An optional feature shown in FIG. 2 is a dispensing line fitting 61 secured to the sidewall of the containment chamber. The fitting 61 is provided to receive a dispensing line should it be desired to run the line through the manway and into the storage tank as opposed to directly into the storage tank. Obviously, when not used, the fitting is capped to seal the interior of the containment chamber. O-ring seals 62 are also used to provide a liquid tight seal.

It can be readily appreciated that several advantages are attained from the assembly of this invention. It provides a safe and convenient method of controlling any spilled liquid during a fill operation of a storage tank and contains any leakage through the fill pipe. The assembly is readily installed to existing underground storage tanks as well as new tanks. It allows ready access to the fill pipe during use. When needed, it can be disassembled so that entry into the storage tank's interior for inspection and repair purposes can be attained. A secondary benefit follows from the vapor and liquid free secondary containment chamber in that the space therein can be used to house an electric dispensing pump for the liquid. Such a space is needed for obvious safety reasons.

Figure 5:
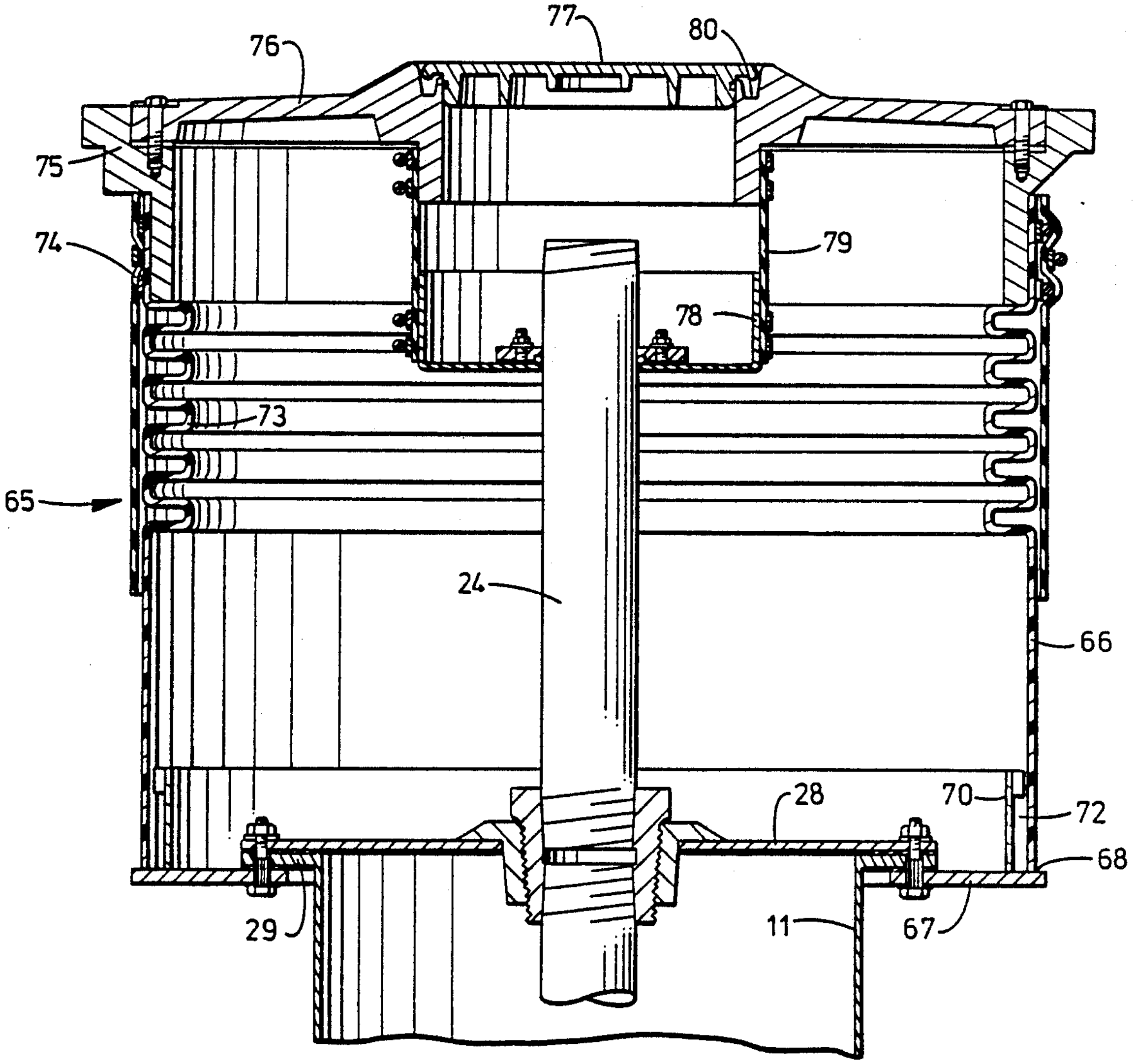
FIG. 5 is a front view partially in section of an alternative containment assembly of this invention.
Figure 6:
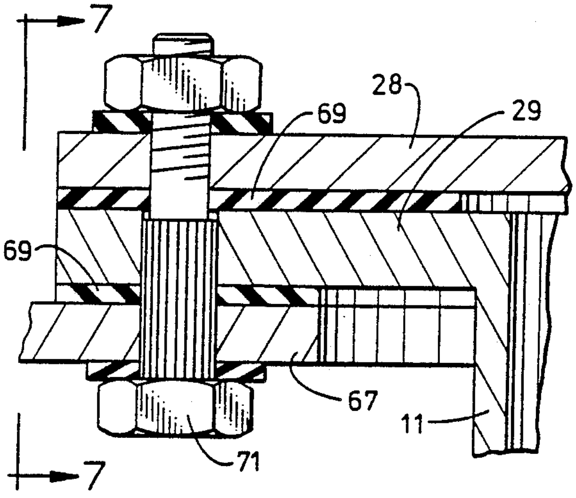
FIG. 6 is a front view partially in section of the containment assembly of FIG. 5 showing attachment means to an underground storage tank in detail.
Figure 7:
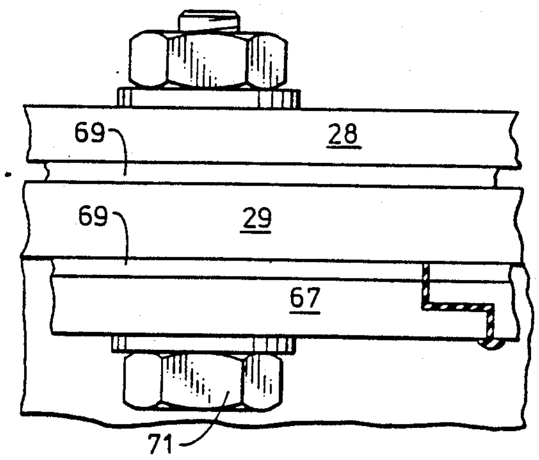
FIG. 7 is a side view of the attachment means taken along line 7—7 of FIG. 6.

FIGS. 5-7 illustrates an alternative means for attaching the assembly onto the manway of a storage tank. In this embodiment of the invention the containment assembly 65 is comprised of a cylindrical-shaped sidewall 66 and a bottom wall 67. A weld 68 is used to secure the two components together. Bottom wall 67 is a split ring with a set of bolt holes near its inner periphery. The bolt holes are in alignment with bolt holes passing through manway cover 28 and manway flange 29. Ring gaskets 69 are used on each side of the manway flange to ensure a good seal. The bottom wall also has an upwardly extending cylindrical shaped flange 70 near its outer edge and fits within the chamber's sidewall 66. Nuts when tightened onto bolts 71 hold the bottom wall of the assembly to the manway. An annular space 72 between the vertical flange 70 and sidewall 66 is optionally filled with resin for sealing purposes. Other features found on the containment assembly 65 such as the corrugated side-wall 73, dirt shield 74, anchor ring 75, bridging surface cover 76, fill pipe lid 77, spill compartment 78 and side collar 79 are as described with reference to FIGS. 2-4.

The benefits of the alternative attachment system of FIGS. 5-7 are its cost advantage in manufacture and its ease of installation to a manway. Thus, during assembly, bottom wall 67 can initially be secured to the manway 11 of the storage tank. Thereafter, wall 66 of the secondary containment chamber 65 is cut to length, positioned on the bottom wall 67 and secured in a sealing fashion. As evident, the assembly of FIG. 5 is readily adapted for needed dimensional alternations in the field.

Figure 8:
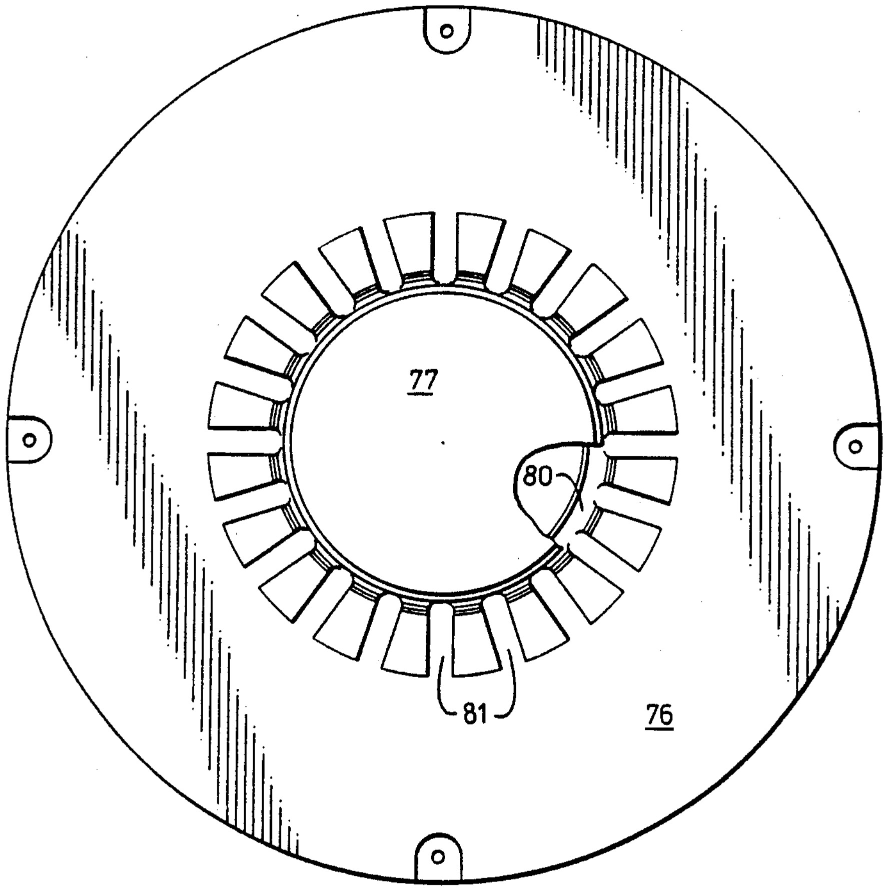
FIG. 8 is a top view of the containment assembly of FIG. 5.

FIG. 8 best illustrates the bridging surface cover 76 of containment assembly 65. Fill pipe lid 77 is positioned in a recessed area 80 found in the surface cover. A series of downwardly and outwardly sloping slots 81 radiate from the cover's raised circular shoulder to its edges. Any water which is collected in the recessed area will be directed to the slots and flow away.

Figure 9:
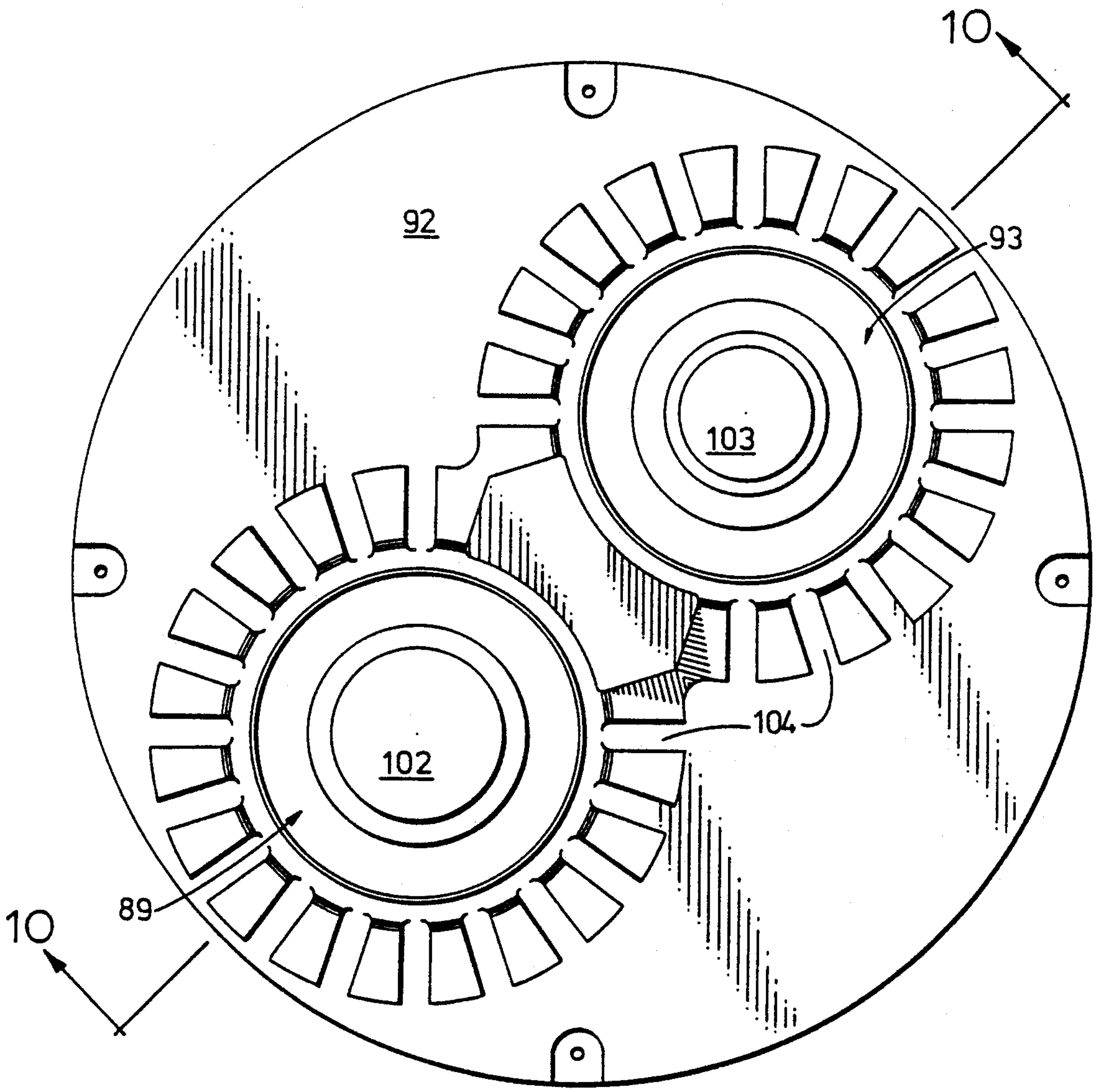
FIG. 9 is a top view of an alternative containment assembly of this invention wherein dual access lids are shown.
Figure 10:
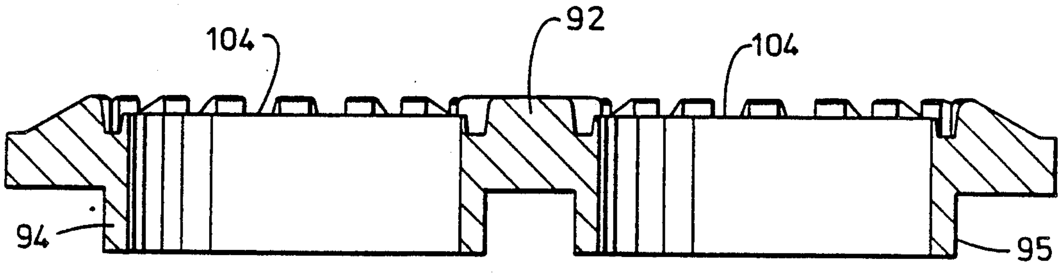
FIG. 10 is a front view in section of the bridging surface cover found on the assembly of FIG. 9 taken along line 10—10 of FIG. 9.
Figure 11:
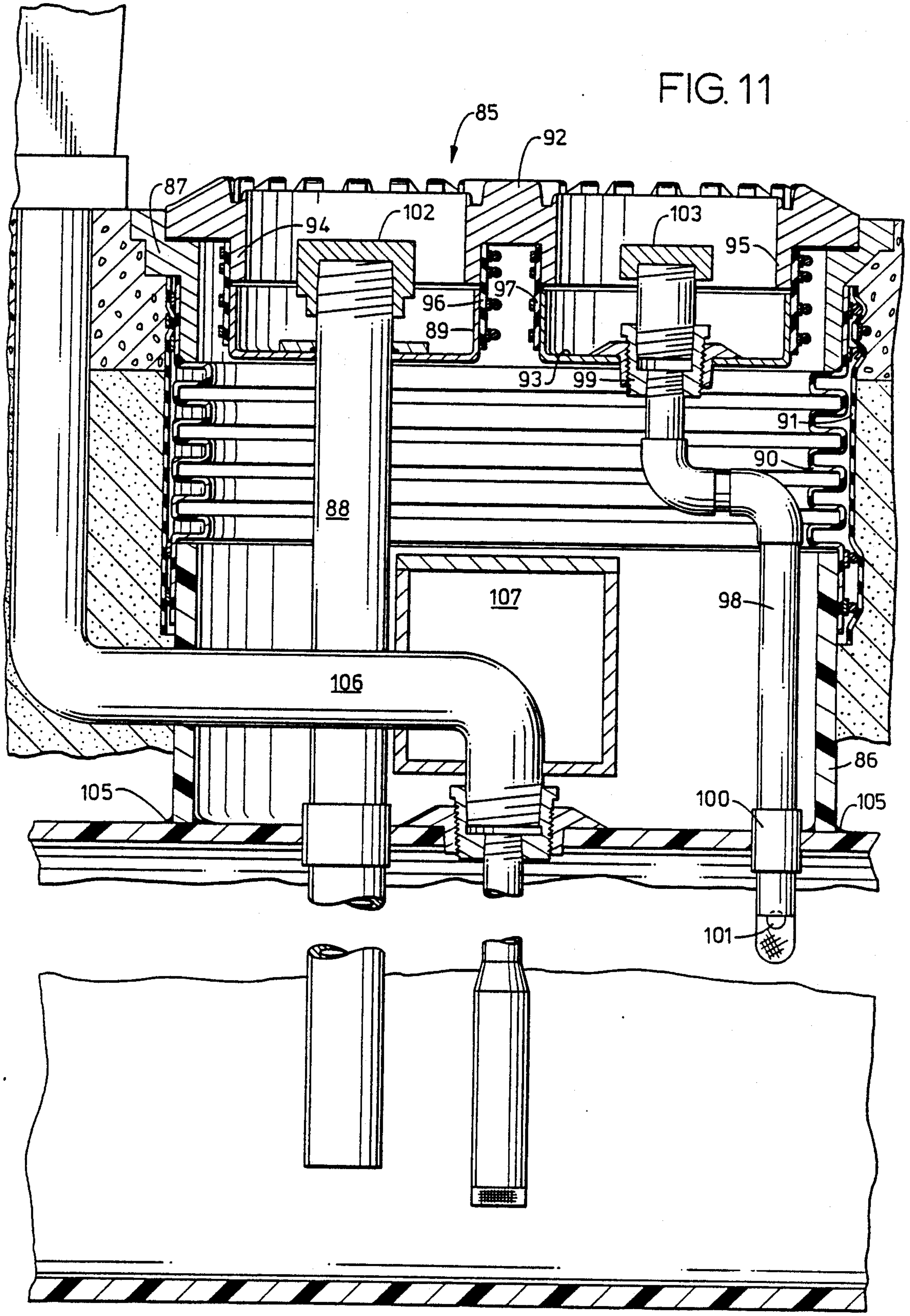
FIG. 11; is a front view partially in section of the containment assembly of FIG. 9.

FIGS. 9-11 illustrate an assembly 85 of the invention having dual access means to the chamber's interior. This containment assembly is useful with two-point delivery fill systems. Such systems utilize a delivery hose having dual lines. One line is used for the flow of gasoline from the transport truck while a second line is used for the return of formed vapors and displaced air in the storage tank to the transport tank. Thus, a gasoline is being delivered from the truck by gravity feed, vacuum which necessarily is formed in the truck's tank pulls vapor/air through the second line into the truck's tank. Such a system substantially eliminates the escape of fuel vapors into the atmosphere during the fill operation.

As best seen in FIG. 11, the containment assembly 85 has a containment chamber 86, anchor ring 87, fill pipe 88 and spill compartment 89 similar in construction to that described with reference to FIG. 2. Containment chamber 86 similarly has sidewall switch a corrugated sidewall portion 90 and dirt shield 91 primarily to withstand ground upheavals. In accord with this embodiment of the invention bridging surface cover 92 is provided with openings to accommodate two lids (not shown). One lid opens to the spill compartment 89 while a second lid opens to a vapor isolation compartment 93. Inner necks 94 and 95 are provided in the surface cover. Side collars 96 and 97 attach to their respective inner neck and compartment. A vapor tube 98 secured to the isolation compartment 93 and the storage tank by bushings 99 and 100, respectively connects the two components. A float valve 101 prevents liquid in the storage tank from entering the tube 98. Caps 102 and 103 seal off fill pipe 88 and vapor tube 98, respectively. As evident in FIGS. 9 and 10, downwardly sloping slots 104 radiate outwardly from each opening. The slots are for the purpose of directing rain water away from the openings.

It should be noted that containment assembly 85 of FIGS. 9-11 is depicted as being attached directly to the tank portion of an underground storage tank. Welds 105 are used for this purpose. In this embodiment of the invention, the dispensing line 106 is illustrated as passing through the containment chamber's sidewall and entering the storage tank within the area confined by the secondary containment chamber 86. A submerged pump 107 is conveniently positioned in the vapor-free containment chamber 86.

As an optional embodiment of the assemblies of the invention, means are provided to monitor the interior of the secondary containment chamber for leakage. Any leakage thor ugh the fill pipe will be contained and if the area is monitored, will allow time for detection and pipe repair. Several commercially available leak detection means can be utilized. Certain of the detection means are positioned in the chamber itself with signal means leading therefrom or vapor/liquid samples can be removed from the chamber through an access tube and to the detection means for analysis. Any such detection means is feasible with the assembly of this invention.

In operation, filling an underground storage tank having the assembly of this invention attached thereto from a transport tank truck proceeds much the same as with conventional systems. Thus, the fill pipe lid is removed to expose the fill pipe. A clamp means for the delivery hose secures the delivery hose to the fill pipe. When accomplished, the operator opens a valve at the truck to begin gravity feed of liquid to the tank. However, in accord with this invention, any spillage will be contained in the spill compartment. Similarly any leakage in the fill pipe will be contained in the secondary containment chamber. When the fill operation is completed, any spilled liquid is best drained from the spill compartment through a drainage hose to the storage tank's interior.

While the invention has been described with reference to the drawings, it should be understood various modifications of that shown are possible. All such modifications of an obvious nature are within the scope of the following claims.

What is claimed is:

1. An assembly for direct attachment in a liquid tight fashion to a manway on an underground storage tank, wherein said assembly provides ready access to a fill pipe from ground level while serving as a secondary containment means and spill containment means for the fill pipe, said assembly comprising:

(a) a secondary containment chamber having a sidewall which is cylindrical-shaped with an inwardly extending lower flange at its bottom and further having a plate which is dimensioned for attachment to the secondary containment chamber's sidewall to serve as a bottom wall of the containment chamber and to serve as a cover for the manway of the storage tank;

(b) an anchor ring which acts as a permanent ground base for the assembly, said anchor ring attached to an upper open end of the containment chamber's sidewall;

(c) a bridging surface cover within the anchor ring to close off the secondary containment chamber's interior, said surface cover having a fill pipe lid which is readily removed to gain access to the chamber's interior for a filling operation;

(d) a fill pipe for delivering liquid to the storage tank, said fill pipe positioned within the secondary containment chamber with a discharging end extending through a bottom of the chamber directly into the storage tank and a receiving end terminating near the bridging surface cover;

(e) an open top spill compartment positioned within the secondary containment chamber and at the receiving end of the fill pipe so as to encompass the receiving end of the fill pipe to catch any spilled liquid from the filling operation and prevent said spilled liquid and vapors from entering the secondary containment chamber; and (f) an attachment system for attaching the assembly directly to the manway of the storage tank, said attachment system comprising (i) a split ring with two sets of bolt holes, a first set used to bolt the split ring to a flange on the manway and a second set used to bolt the split ring to the chamber's inwardly extending lower flange, (ii) a second ring to sit on a top surface of the chamber's lower flange, said second ring having a set of bolt holes which align with the second set of bolt holes on the split ring and (iii) a set of bolts, wherein tightening of the bolts achieves a secure attachment of the assembly to the manway of the storage tank.

2. The assembly of claim 1 wherein the sidewall of the secondary containment chamber has corrugated expansion means for alleviating dimensional changes in the chamber caused by ground movement.

3. The assembly of claim 2 further comprising a dirt shield extending around the secondary containment chamber and attached thereto at an upper portion to prevent soil from making contact with the chamber's corrugated expansion means.

4. The assembly of claim 1 further comprising a drainage hose extending from the spill compartment to the storage tank.

5. The assembly of claim 4 further wherein valve means are operably associated with the drainage hose to regulate flow of liquid therethrough.

6. The assembly of claim 5 wherein the drainage hose is a flexible and extendable hose to accommodate disassembly of the assembly for maintenance purposes.

7. The assembly of claim 1 wherein the anchor ring has a shoulder on which the bridging surface cover rests and an extending neck for attaching the containment chamber to the anchor ring.

8. The assembly of claim 1 further wherein a pipe fitting is provided in the sidewall of the containment chamber to receive a dispensing line leading from the storage tank, through the containment chamber and to a ground level dispenser.

9. The assembly of claim 1 wherein the interior of the containment chamber is sealed to prevent liquid and vapors from entering.

* * * * *